US011427489B2

United States Patent
Sumino et al.

(10) Patent No.: US 11,427,489 B2
(45) Date of Patent: Aug. 30, 2022

(54) CARRIER FOR RETAINING ANAMMOX BACTERIA FOR USE IN WASTEWATER TREATMENT, ANAMMOX BACTERIA-ADHERED PARTICLE, AND WASTEWATER TREATMENT APPARATUS USING THE CARRIER

(71) Applicants: TOYO UNIVERSITY, Tokyo (JP); TOYO TANSO CO., LTD., Osaka (JP)

(72) Inventors: Tatsuo Sumino, Gunma (JP); Satoshi Sakuma, Gunma (JP); Tetsuro Tojo, Osaka (JP); Ai Ishikawa, Osaka (JP); Tomoya Nakazono, Osaka (JP); Masatoshi Takeshita, Osaka (JP)

(73) Assignees: TOYO UNIVERSITY, Tokyo (JP); TOYO TANSO CO.. LTD., Osaka (JP)

( * ) Notice: Subject to any disclaimer, the term of this patent is extended or adjusted under 35 U.S.C. 154(b) by 0 days.

(21) Appl. No.: 16/772,266

(22) PCT Filed: Dec. 13, 2018

(86) PCT No.: PCT/JP2018/045854
§ 371 (c)(1),
(2) Date: Jun. 12, 2020

(87) PCT Pub. No.: WO2019/117243
PCT Pub. Date: Jun. 20, 2019

(65) Prior Publication Data
US 2021/0087091 A1    Mar. 25, 2021

(30) Foreign Application Priority Data
Dec. 13, 2017  (JP) .............................. JP2017-238691

(51) Int. Cl.
*C02F 3/34*    (2006.01)
*C02F 3/30*    (2006.01)
(Continued)

(52) U.S. Cl.
CPC ................ *C02F 3/34* (2013.01); *C02F 3/307* (2013.01); *C02F 2003/003* (2013.01); *C02F 2101/16* (2013.01)

(58) Field of Classification Search
CPC ...... C02F 3/34; C02F 3/307; C02F 2003/003; C02F 2101/16; C02F 3/301; C02F 3/303; C02F 3/106; Y02W 10/10
(Continued)

(56) References Cited

U.S. PATENT DOCUMENTS

2007/0119776 A1*  5/2007  Isaka ..................... C12N 11/04
                                                       210/601
2016/0023931 A1*  1/2016  Esteve Nunez ....... C02F 3/2866
                                                       210/617

FOREIGN PATENT DOCUMENTS

CN    101054236 A       10/2007
CN    102115257 A   *   7/2011
(Continued)

OTHER PUBLICATIONS

Machine-generated English translation of JP 2007-125460, generated on Apr. 26, 2021.*
(Continued)

*Primary Examiner* — Fred Prince
(74) *Attorney, Agent, or Firm* — Rankin, Hill & Clark LLP

(57) ABSTRACT

[Problem] A carrier for retaining anammox bacteria, an anammox bacteria-adhered particle, and a wastewater treatment apparatus are provided that can remarkably reduce the start-up period for obtaining a nitrogen removal speed of 1 kg-N/m³/day.
[Solution] A carrier for retaining anammox bacteria includes carbon particles. The carbon particles are desirably graphite particles, particularly isotropic graphite particles. The car-
(Continued)

bon particles desirably have a zeta potential of −35 mV to 0 mV and an average particle size of 2 µm to 1000 µm.

20 Claims, 9 Drawing Sheets

(51) Int. Cl.
  *C02F 3/00* (2006.01)
  *C02F 101/16* (2006.01)
(58) Field of Classification Search
  USPC ....... 210/601, 615, 616, 617, 150, 151, 903; 435/177
  See application file for complete search history.

(56) References Cited

FOREIGN PATENT DOCUMENTS

| | | | | |
|---|---|---|---|---|
| CN | 102249481 | A | * | 11/2011 |
| CN | 102765805 | A | | 11/2012 |
| CN | 103159325 | A | * | 6/2013 |
| CN | 103193315 | A | | 7/2013 |
| EP | 1780271 | A1 | * | 5/2007 |
| JP | 2002-143889 | A | * | 5/2002 |
| JP | 2002-346593 | A | * | 12/2002 |
| JP | 2003-53382 | A | | 2/2003 |
| JP | 2007-82485 | A | * | 4/2007 |
| JP | 2007-125460 | A | * | 5/2007 |
| JP | 2015-124306 | A | * | 7/2015 |

OTHER PUBLICATIONS

Machine-generated English translation of JP 2007-82485, generated on Apr. 26, 2021.*
Machine-generated English translation of JP 2002-346593, generated on Apr. 26, 2021.*
Machine-generated English translation of CN 102115257, generated on Apr. 26, 2021.*
Machine-generated English translation of CN 102249481, generated on Apr. 26, 2021.*
Machine-generated English translation of CN 103159325, generated on Apr. 26, 2021.*
Machine-generated English translation of JP 2015-124306, generated on Apr. 26, 2021.*
Machine-generated English translation of JP 2002-143889, generated on Apr. 26, 2021.*
"Development of technology to utilize useful microorganisms for nitrogen treatment of sewage and industrial wastewater", New Age of University, Innovative University, Nikkei Business, Dec. 28, 2015 and Jan. 4, 2016 combined issue, vol. 9, total 5 pages; English machine translation; Cited in Specification.
International Search Report (ISR) dated Mar. 5, 2019 issued in PCT/JP2018/045854.
Liu et al., "Carbon nanotubes/carbon fiber hybrid material: a super support material for sludge biofilms", Environmental Technology, 2018, vol. 39, No. 16, pp. 2105-2116, total 13 pages; Cited in SGOA.
Morinaga et al., "Stimulation of bacterial activity by the addition of different PACS", Environmental Technology, 2003, vol. 24, pp. 179-186, total 9 pages; Cited in SGOA.
Zhang et al., "Denitrification effect of Heterotrophic Nitrifying and Aerobic Denitrifying Bacteria Strain qy37 Immobilized in Absorbent and Entrapping Materials", Environmental Science & Technology, 2012, vol. 35, No. 1, pp. 32-37, total 14 pages, English machine translation; Cited in SGOA.
Singapore Office Action (SGOA) dated Jul. 22, 2021 for the corresponding Singapore Patent Application No. 11202005492Y.
Chinese Office Action (CNOA) dated May 5, 2022 for corresponding Chinese Patent Application No. 201880080293.5.

* cited by examiner

CARRIER FOR RETAINING ANAMMOX BACTERIA FOR USE IN WASTEWATER TREATMENT, ANAMMOX BACTERIA-ADHERED PARTICLE, AND WASTEWATER TREATMENT APPARATUS USING THE CARRIER

TECHNICAL FIELD

The present invention relates to a carrier for retaining anammox bacteria for use in a wastewater treatment, an anammox bacteria-adhered particle, and a wastewater treatment apparatus using the carrier.

BACKGROUND ART

A cause of eutrophication is that nitrogen and phosphorus that have been contained in domestic wastewater, industrial wastewater, and agricultural wastewater remain within closed water in the natural world. Among approximately 2,200 sewage treatment plants throughout the whole country, only approximately 100 plants are able to perform a sufficient nitrogen treatment (see Non-patent literature 1).

Examples of the treatment methods for nitrogen contained in wastewater include catalyst degradation methods, direct combustion methods, hypochlorous acid impregnation methods, and biodegradation methods. In many cases, the biodegradation methods are utilized particularly for decomposition of ammonia nitrogen at a level of 1 ppm to 1,000 ppm, partly because of cost considerations (see Patent Literature 1 listed below). This wastewater treatment using biodegradation is a technique of causing microorganisms to be adhered to an immobilized carrier to decompose organic substances and nitrogen contained in the wastewater, in which the treatment is performed through the process of nitrification and nitrogen removal (hereinafter also referred to as denitrification). However, this method has various problems. For example, the denitrification process requires a hydrogen donor (methanol addition), and the nitrification process requires a large aeration volume.

In view this, a technique of treating nitrogen using an anammox reaction with anammox bacteria has been proposed in recent years as a new technique of nitrogen removal. This nitrogen removal technique using anammox bacteria makes it possible to perform the treatment in an anaerobic atmosphere and to reduce the supply of organic substance that serves as a hydrogen donor. Therefore, the nitrogen treatment technique using anammox bacteria has the advantage that it can reduce the aeration volume and the amount of methanol to be added.

CITATION LIST

Patent Literature

[Patent Literature 1] Japanese Published Unexamined Patent Application No. 2003-053382

Non-Patent Literature

[Non-patent Literature 1] Nikkei Business (Dec. 28, 2015 and Jan. 4, 2016 combined issue)

SUMMARY OF INVENTION

Technical Problem

However, the anammox bacteria have a division time (i.e., doubling time) of about 10 days, which means that the proliferation rate is significantly low. Therefore, it takes about 6 months for starting up to obtain a nitrogen removal speed of 1 kg-N/m$^3$/day, which is defined as the amount of ammonia nitrogen produced per unit volume per day. For this type of apparatus, it is required that the start-up period at a user site be within 1 month, so a problem is that the user requirements cannot be satisfied by merely using anammox bacteria.

The present invention has been accomplished in view of the foregoing circumstances, and it is an object of the invention to provide a carrier for retaining anammox bacteria, an anammox bacteria-adhered particle, and a wastewater treatment apparatus that can remarkably reduce the start-up period for obtaining a nitrogen removal speed of 1 kg-N/m$^3$/day.

Solution to Problem

In order to accomplish the foregoing object, the present invention is characterized in that carbon particles are used as a bacteria carrier.

Advantageous Effects of Invention

The present invention achieves a significant advantageous effect of remarkably reducing the start-up period for obtaining a nitrogen removal speed of 1 kg-N/m$^3$/day.

DESCRIPTION OF EMBODIMENTS

Figure 1:
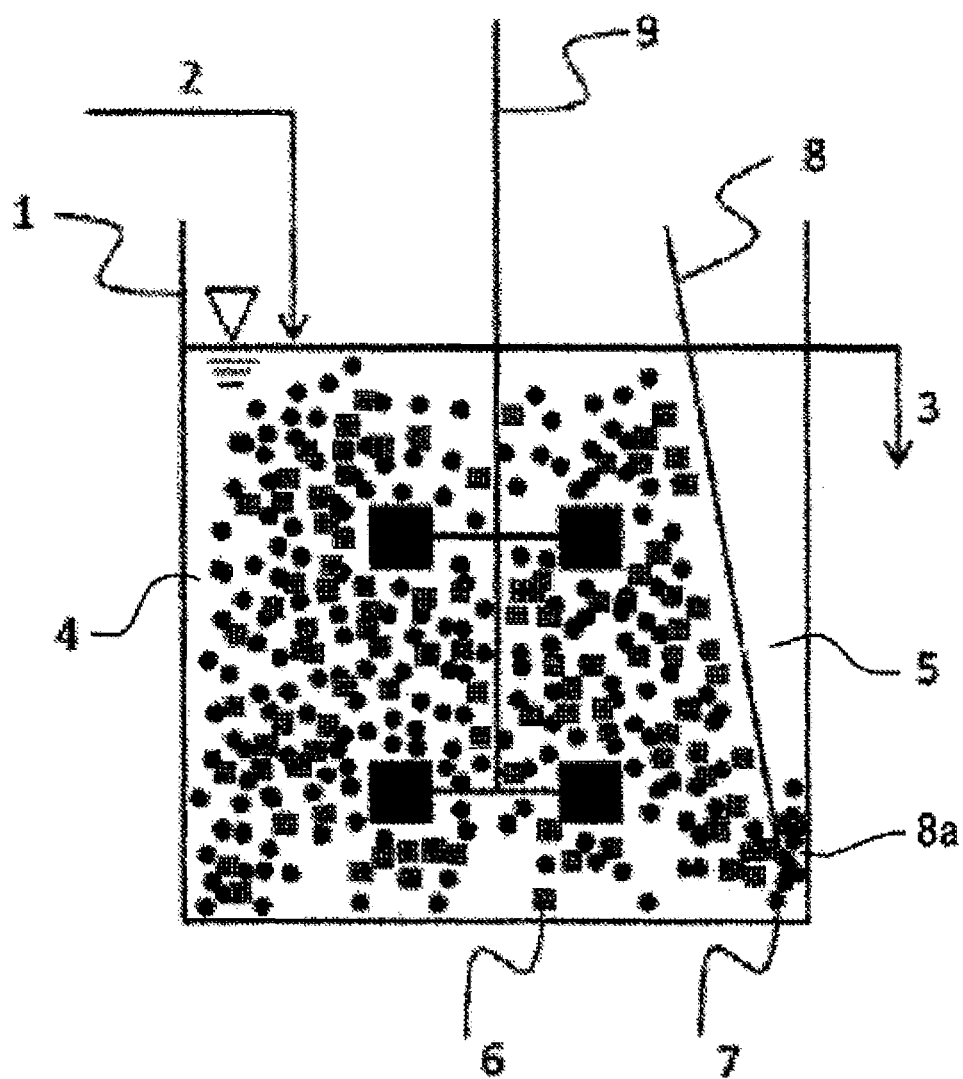
FIG. 1 is a schematic view illustrating a wastewater treatment apparatus used in Example 1.

An embodiment of a carrier for retaining anammox bacteria according to the present invention (hereinafter also simply referred to as "carrier") is characterized by including carbon particles. This carrier may be an aggregate in which carbon particles are aggregated.

The just-described configuration allows anammox bacteria to be easily adhered to the carrier for retaining anammox bacteria, and therefore, makes it possible to significantly reduce the start-up period for obtaining a nitrogen removal speed of 1 kg-N/m$^3$/day.

Examples of the carbon particles include particles of graphite, activated carbon, carbon black, carbon nanotube, and fullerene. Graphite particles are desirable because it is easy to obtain a particle size suitable for bacteria to adhere thereto. Examples of the graphite particles include artificial graphite particles and natural graphite particles. Examples of the artificial graphite particles include isotropic graphite particles and anisotropic graphite particles. From the viewpoints of the strength of the carrier and the adhering capability of bacteria due to pores, it is desirable to employ graphite, more desirably isotropic graphite. Moreover, because graphite particles can be manufactured in a greater amount at lower cost than carbon nanotubes and the like, graphite particles are more advantageous.

It is desirable that the carrier for retaining anammox bacteria that includes the carbon particles have an apparent zeta potential (hereinafter also simply referred to as "zeta potential") of −35 mV to 0 mV.

When the zeta potential of the carrier is restricted to be in the range of −35 mV to 0 my, the anammox bacteria can be more easily adhered to the carrier.

It is preferable that the zeta potential be greater than or equal to −30 mV, more preferably greater than or equal to −20 mV.

In the present application, the zeta potential of the carrier means the value measured according to the following.

(1) 1 g of carrier is added to 50 mL of water.

(2) The mixture is stirred with a spoon for 1 minute, and thereafter stirred with an ultrasonic cleaner (ultrasonic cleaner ASU-10 manufactured by AS ONE corp.) at a frequency of 40 Hz and an output power of 240 W for 5 minutes.

(3) Immediately after the stirring, 1 mL of (2) is filled into a dip cell, and the zeta potential is measured using a zeta potential measurement device (Zetasizer Nano ZS90 manufactured by Malvern Ltd.) with a red laser at a wavelength of 633 nm. The pH at the time of the measurement is 7. The measurement is carried out three times, and the average value of the measurements is employed as the zeta potential of the carrier.

It is desirable that the average particle size of the carbon particles be from 2 μm to 1000 μm, preferably from 2 μm to 500 μm, and more preferably from 8 μm to 200 μm.

When the average particle size of the carbon particles is within the foregoing ranges, the anammox bacteria can be adhered to the carrier more easily.

The carbon particles may be bonded to each other by a binder agent.

When the carbon particles are bonded to each other by the binder agent, the strength of the carrier in water is improved so as to prevent degradation of the bonded carbon particles in water. As a result, the above-described advantageous effects can be obtained more significantly. An example of the binder agent is polyvinyl alcohol (PVA).

An embodiment of the present invention is characterized in that the anammox bacteria-adhered particle is disposed in a wastewater treatment tank.

The use of the anammox bacteria-adhered particle can remarkably reduce the start-up period until the nitrogen removal speed reaches a predetermined value, and moreover, the anammox bacteria make it possible to treat wastewater smoothly. Therefore, it is possible to provide a wastewater treatment apparatus that is excellent in treatment capability.

Another embodiment of the present invention is characterized in that the anammox bacteria-adhered particle and a nitrifying bacteria-adhered particle in which nitrifying bacteria are adhered to carbon particles are disposed in a common wastewater treatment tank. In this embodiment, the anammox bacteria, which are anaerobic, and the nitrifying bacteria, which are aerobic, are caused to work under an appropriate amount of dissolved oxygen, and this is referred to as a SNAP process.

Such an embodiment makes it possible to convert part of ammonia nitrogen into nitrite nitrogen by nitrifying bacteria and also convert ammonia nitrogen and nitrite nitrogen into nitrogen gas by anammox bacteria. When nitrifying bacteria serve to cause part of the wastewater treatment reaction in this way, the anammox reaction takes place more smoothly.

Another embodiment of the present invention is characterized by providing a wastewater treatment section that treats wastewater by stirring and flowingly moving the anammox bacteria-adhered particle, and a waste material reserving section that stores carbon particles that have lost anammox activity and from which the anammox bacteria have been detached, and characterized in that the wastewater treatment section and the waste material reserving section are separated from each other.

When the wastewater treatment section and the waste material reserving section are separated from each other, it means that only the anammox bacteria-adhered particles retaining anammox activity are present in the wastewater treatment section. As a result, it is possible to significantly improve the treatment capability of the wastewater treatment apparatus.

It is also desirable that the wastewater treatment apparatus further include a carbon particle supply unit that supplies carbon particles constantly or intermittently to the wastewater treatment tank. When carbon particles are supplied constantly or intermittently to the wastewater treatment tank, the supplied carbon particles serve as new carriers, and anammox bacteria are adhered thereto. As a result, the treatment capability of the wastewater treatment apparatus is improved more significantly.

Specifically, it is possible to provide a reservoir tank that stores carbon particles above the wastewater treatment section, and carbon particles are dropped into the wastewater treatment section constantly or at every predetermined time.

Hereinbelow, the present invention will be described with reference to examples, but it should be noted that the present invention is in no way limited to the following examples.

Example 1

Example 1 uses a wastewater treatment apparatus as illustrated in FIG. 1. As illustrated in FIG. 1, the wastewater treatment apparatus includes a reaction tank 1. The reaction tank 1 includes a wastewater treatment section 4 for performing wastewater treatment, and a waste material reserving section 5 for storing carbon particles that have lost anammox activity and from which anammox bacteria have been detached (hereinafter, the carbon particles may also be referred to as "waste material"). By providing the waste material reserving section 5 in this way, it is possible to prevent the waste material from remaining in the wastewater treatment section 4 and thereby prevent the treatment capability of the wastewater treatment section 4 from degradation. The reaction tank 1 has such a structure that wastewater is supplied from a wastewater inflow portion 2 and treated water flows out from a treated water outflow part 3. In FIG. 1, reference numeral 6 denotes a carbon particle to which anammox bacteria are adhered (anammox bacteria-adhered particle), reference numeral 7 denotes a carbon particle from which the anammox bacteria are detached, and reference numeral 9 denotes an agitator.

Herein, the wastewater treatment section 4 and the waste material reserving section 5 are separated from each other by a shield plate 8, and the shield plate 8 is inclined so that the waste material reserving section 5 is tapered downwardly. The reason for employing such a structure is as follows. When operating the wastewater treatment apparatus, an aggregate 31 of anammox bacteria-adhered particles that retain anammox activity is present in an upper region, while carbon particles 30 that have lost anammox activity and from which the anammox bacteria have been detached are present in a lower region. By pressing the water surface, the carbon particles 30 can be moved from the wastewater treatment section 4 to the waste material reserving section 5 through a lower-end opening 8a, which is formed in the shield plate 8. At this time, if the lower-end opening 8a is large, not only the carbon particles 30 but also the aggregate 31 of the anammox bacteria-adhered particles may move into the waste material reserving section 5. In order to prevent such an event, the shield plate 8 is inclined to make the lower-end opening 8a small. This serves to provide a sufficient volume of the waste material reserving section 5 and also prevents the aggregate 31 of anammox bacteria-adhered particles from moving into the waste material reserving section 5.

In the wastewater treatment apparatus shown in FIG. 1, 20 mL of graphite particles (with a filling rate of 1.3 volume %) and 78 mL of anammox bacteria (with a filling rate of 5.0 volume %) were put into the reaction tank 1 (volume: 1.55 L), and thereafter, the reaction tank 1 was filled with test sample wastewater. The graphite particles used were isotropic graphite particles manufactured by Toyo Tanso Co., Ltd., which had a zeta potential of −9.1 mV and an average particle size of 40 μm, and the graphite particles were suspended in water.

The average particle size of the graphite particles was determined in the following manner.

In the present application, the average particle size of the carbon particles refers to the value obtained in the following manner.

(1) A beaker was charged with 60 cc of pure water, and 5 mg of graphite particles was put therein.

(2) 2 mL of surfactant, polyethylene oxide (polyoxyethylene (10) octylphenyl ether), was dropped into the beaker filled with (1).

(3) The beaker filled with (2) was subjected to untrasonication for 5 minutes using an ultrasonic cleaner ASU-10 available from AS ONE corp.

(4) Using a particle size analyzer Partica LA-950V2 manufactured by HORIBA Ltd., the particle size determination was conducted according to carbon measurement conditions.

In addition, to promote the growth of anammox bacteria, two kinds of trace elements set forth in Tables 1 and 2 below were added in an amount of 1 mL each per 1000 mL of test sample wastewater. In addition, the test sample wastewater was prepared as follows. Inorganic synthetic wastewater (T-N 954 mg/L) shown in Table 3 below was diluted or densified with tap water so that T-N became 100 mg/L to 1300 mg/L. Herein, T-N means the total nitrogen concentration, which is represented by the following equation.

$$T\text{-}N = [NH_4\text{-}N] + [NO_3\text{-}N] + [NO_2\text{-}N]$$

TABLE 1

| Component | Concentration(mg/L) |
|---|---|
| EDTA | 5000 |
| FeSO$_4$ | 5000 |

TABLE 2

| Component | Concentration (mg/L) |
|---|---|
| EDTA | 15000 |
| H$_3$BO$_4$ | 14 |
| CuSO$_4$·5H$_2$O | 250 |
| MnCl$_2$·4H$_2$O | 990 |
| NaMoO$_4$·2H$_2$O | 220 |
| ZnSO$_4$·2H$_2$O | 430 |
| CoCl$_2$·6H$_2$O | 240 |
| NiCl$_2$·6H$_2$O | 190 |

TABLE 3

| Component | Concentration (mg/L) |
|---|---|
| NH$_4$Cl | 2320 |
| NaNO$_2$ | 1710 |
| NaHCO$_3$ | 2500 |
| KH$_2$PO$_4$ | 675 |
| MgSO$_4$ | 1500 |
| CaCl$_2$ | 750 |

The treatment operation was carried out so that the flow rate and the concentration were gradually increased to thereby increase the nitrogen load (i.e., T-N load). In the operation, the residence time was set to 8 hrs. to 20 hrs., and the test sample wastewater T-N concentration (hereinafter simply referred to as nitrogen concentration) was set to 100 mg/L to 1300 mg/L.

The calculation of the nitrogen load Lv was performed according to the following.

$$Lv = (C \times Q)/(V \times 1000)$$

Lv: nitrogen load (kg-N/m$^3$/day)
C: test sample wastewater T-N (mg/L)
Q: flow rate (L/day)
V: reactor volumetric capacity (L)

Figure 3:
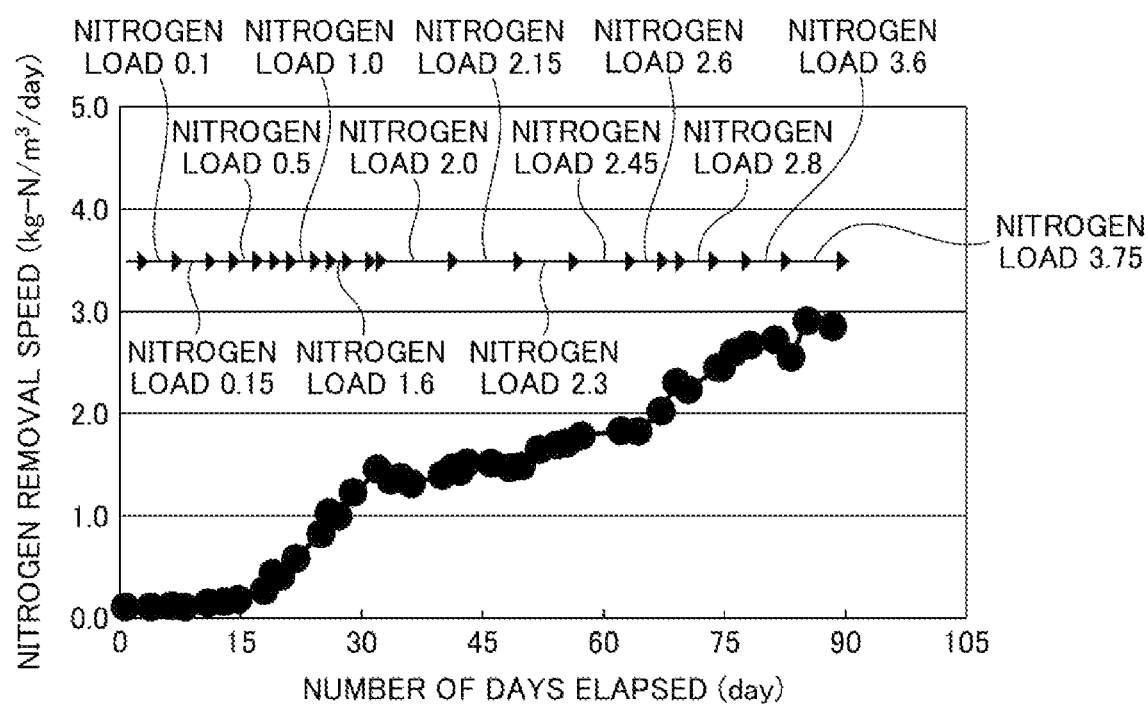
FIG. 3 is a graph illustrating the results of treatment when wastewater is treated with the wastewater treatment apparatus of Example 1.

The results obtained by treating the test sample wastewater are shown in FIG. 3. The nitrogen removal speed means the T-N nitrogen removal speed. From the start of the operation to day 8, the nitrogen removal speed remained approximately at the same level, 0.08 kg-N/m$^3$/day to 0.10 kg-N/m$^3$/day. The nitrogen removal percentage represented by the following equation (1) was observed to be very high, 67.2% to 90.7% from the initial stage of the operation.

$$\delta = ((C0 - C1)/C0) \times 100 \qquad (1)$$

δ: nitrogen removal percentage (%)
C0: test sample wastewater T-N (mg/L)
C1: treated water T-N (mg/L)

It was confirmed that the nitrogen removal speed gradually increased from day 11 to day 15, and the nitrogen removal speed suddenly increased from day 18 onward. Further, it was observed that the nitrogen removal speed reached 0.55 kg-N/m$^3$/day on day 21 of the operation, 1.06 kg-N/m$^3$/day on day 26 of the operation, and 1.50 kg-N/m$^3$/day on day 32 of the operation. Thus, the nitrogen removal speed exceeded 1.0 kg-N/m$^3$/day on day 26. Therefore, it is demonstrated that the present invention is able to reduce the start-up period to less than or equal to 1 month.

Figure 9:
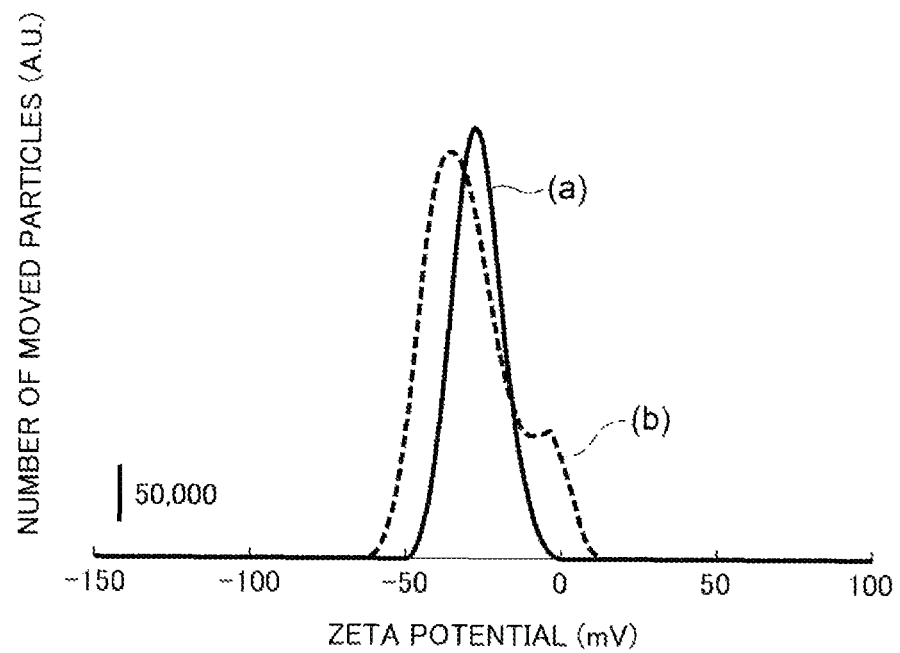
FIG. 9 is a graph illustrating the relationship between the zeta potential and the cumulative strength (the number of moved particles) (a: anammox bacteria-adhered particle, and b: nitrifying bacteria-adhered particle).

Moreover, on day 18, an aggregate in reddish-brown color, which is believed to be granule, was observed, and it was confirmed that the generated nitrogen gas was adhered to graphite particles and flowed out of the system. In addition, it was observed that the nitrogen removal speed reached 3.0 kg-N/m$^3$/day, which is considered to be excellent, within about 90 days. Note that FIG. 9 shows the results of measurement of apparent zeta potential of the anammox bacteria-adhered particle. The measurement of zeta potential was carried out in the same manner as used for obtaining the apparent zeta potential of the carrier. The value of the zeta potential was found to be −26.6 mV. Since the zeta potential of carrier prior to adhering of anammox bacteria was −9.1 mV, it is appreciated that the change in zeta potential was caused because of adhering of anammox bacteria to the carrier.

Example 2

Figure 4:
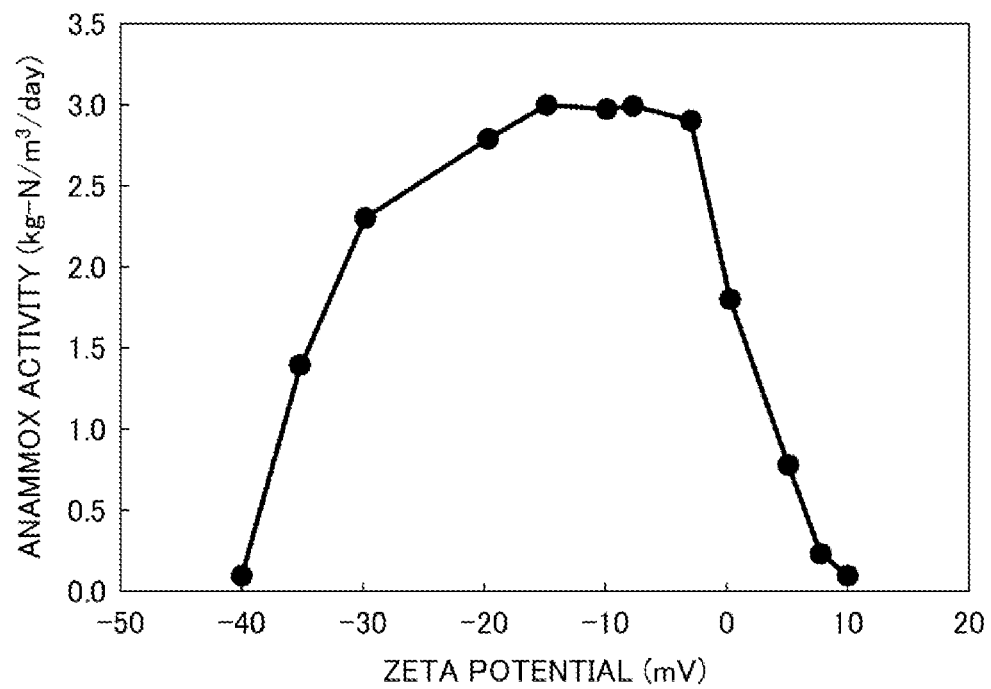
FIG. 4 is a graph illustrating the relationship between the zeta potential of a carrier and the anammox activity on 90 days after the start of experiment.

The relationship between the zeta potential of carrier (i.e., the zeta potential in a state in which bacteria are not adhered) and the anammox activity on day 90 after the start of experiment was investigated in the same manner as described in Example 1 above. The results are shown in FIG. 4. Note that the zeta potential was adjusted by varying the particle size distribution of the carbon particles. As clearly seen from FIG. 4, it was observed that the zeta potential should preferably be in the range of −35 mV to 0 mV, more preferably in the range of −30 mV to 0 mV, and still more preferably in the range of −20 mV to 0 mV.

Figure 5:
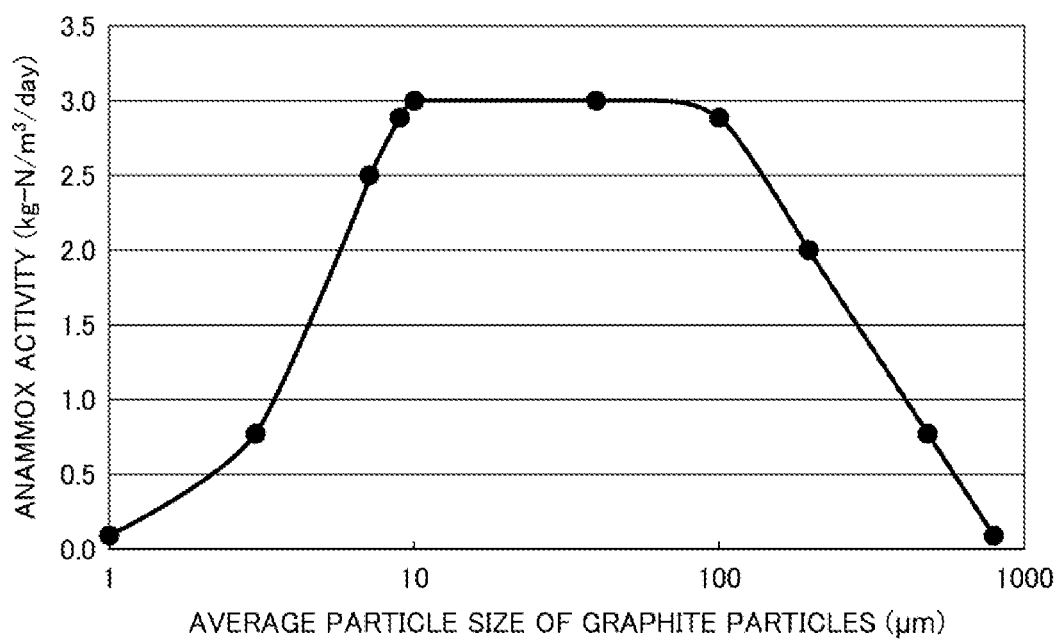
FIG. 5 is a graph illustrating the relationship between the average particle size of graphite particles and the anammox activity on 90 days after the start of experiment.

In addition, the relationship between the average particle size of graphite particles (carbon particles) and the anammox activity on day 90 after the start of experiment was investigated in the same manner as described in Example 1 above. The results are shown in FIG. 5. As clearly seen from FIG. 5, it was observed that the average particle size of carbon particles should preferably be in the range of 2 μm to 1000 μm, more preferably in the range of 2 μm to 500 μm, and still more preferably in the range of 8 μm to 200 μm.

Example 3

Figure 6:
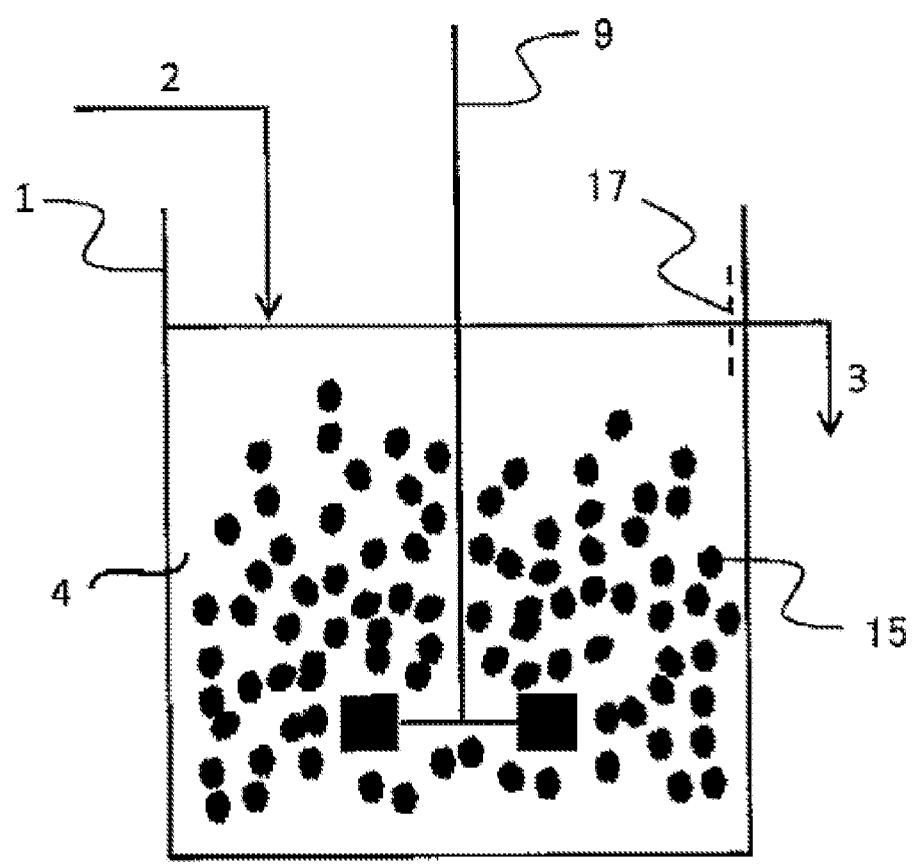
FIG. 6 is a schematic view illustrating an apparatus of the present invention used in Example 3.

A carrier for retaining anammox bacteria was prepared by bonding graphite particles having an average particle size of 20 μm to each other with PVA. A treatment operation was carried out in the same manner as described in Example 1 above, except that the prepared carrier was filled in the wastewater treatment apparatus shown in FIG. 6. In FIG. 6, like components having the same functions as those depicted in FIG. 1 are designated by like reference numerals. In FIG. 6, reference numeral 15 denotes an anammox bacteria-adhered particle, and reference numeral 17 denotes a separating section.

The results of the experiment show that a nitrogen removal speed of 1.25 kg-N/m$^3$/day was achieved in 1 month, and a maximum nitrogen removal speed of 5.95 kg-N/m$^3$/day was achieved on day 173 of the operation (the photograph is shown in FIG. 6). From the foregoing, it is observed that the configuration of Example 3 is also able to treat anammox bacteria at a high rate.

Figure 2:
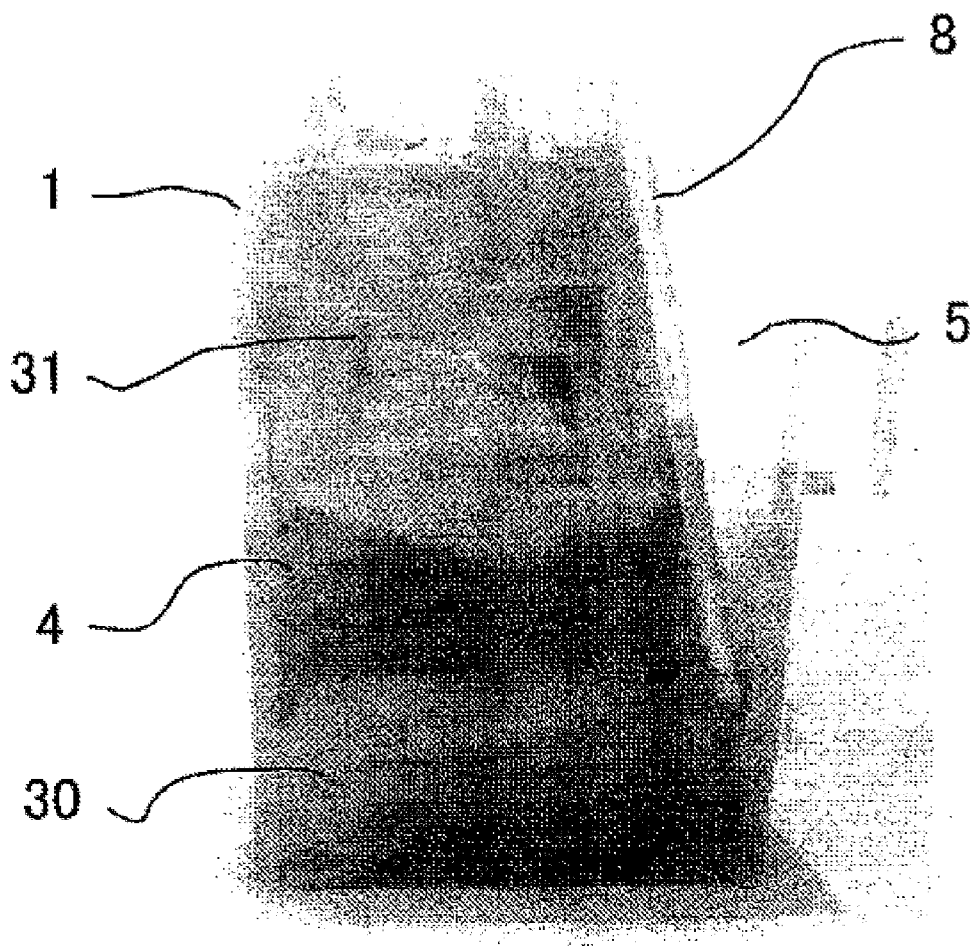
FIG. 2 is a photograph showing an operating state of the wastewater treatment apparatus used in Example 1.
Figure 7:
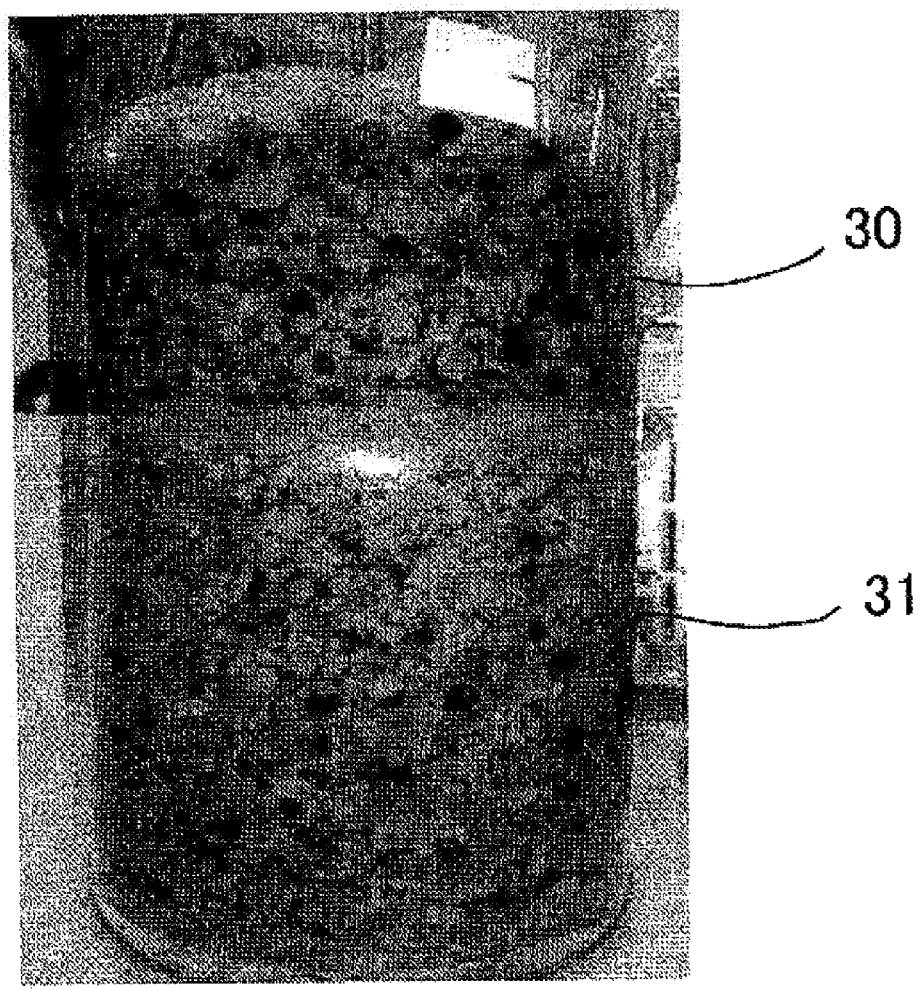
FIG. 7 is a photograph showing an operating state of a wastewater treatment apparatus used in Example 3.

FIG. 7 shows that the aggregate 31 of anammox bacteria-adhered particles that retain anammox activity is present in the lower region, while the aggregate 30 of anammox bacteria-adhered particles that have lost anammox activity is present in the upper region. Thus, the positions of the aggregate 30 and the aggregate 31 are upside down in contrast to the case of FIG. 2. Taking these things into consideration, the separating section 7 is disposed in an upper portion of the wastewater treatment apparatus.

Example 4

A single tank-type nitrification and denitrification was investigated using a carrier to which nitrifying bacteria were adhered (i.e., using what is called the SNAP process) as well as the carrier to which anammox bacteria were adhered. The conditions of the experiment are set forth below. Note that the same type of wastewater treatment apparatus as used in Example 1 was used as the wastewater treatment apparatus.

(1) Single Tank-Type Nitrification and Denitrification Apparatus Specification
Reactor: 1.1 L
Filling rate of anammox bacteria-adhered particle: 5 volume %
Filling rate of nitrifying bacteria-adhered particle: 5 volume %
Control temperature: 25° C.
Aeration volume (gas mixture of nitrogen and air in a ratio of 1/9 was used): 1 L/min.
(2) Operating Conditions
Synthetic wastewater treatment (synthetic wastewater shown in Table 4 was diluted to 40 mg/L)
Residence time: 6 hrs. to 8 hrs.

The anammox bacteria-adhered particle used was the one with which the operation was completed in Example 1 above.

The nitrifying bacteria-adhered particle was a carrier in which nitrifying bacteria were cultured in synthetic wastewater $NH_4$—N 200 mg/L shown in the following Table 4 and to which the nitrifying bacteria were adhered. A gas mixture of nitrogen and air in a ratio of 1/9 was used for aeration, and the dissolved oxygen was adjusted to be 1 mg/L or less.

TABLE 4

| Chemical Name | Composition (mg/L) |
|---|---|
| $NH_4Cl$ | 0.764 |
| $NaHCO_3$ | 2.343 |
| $Na_2HPO_4 \cdot 12H_2O$ | 0.231 |

The results of the experiment show that the nitrogen removal percentage was stabilized on day 20 of the operation, and the nitrogen removal percentage obtained was in the range of 50% to 62%. It is believed that part of ammonia nitrogen was converted into nitrite nitrogen by the nitrifying bacteria-adhered particle, and ammonia nitrogen and nitrite nitrogen were converted into nitrogen gas by the anammox bacteria-adhered particle. Note that FIG. 9 shows the results of measurement of apparent zeta potential of the nitrifying bacteria-adhered particle. The measurement of zeta potential was carried out in the same manner as used for obtaining the apparent zeta potential of the carrier. The value of the zeta potential was found to be −10 mV. Since the zeta potential of the carrier prior to adhering of nitrifying bacteria was −30.9 mV, it is appreciated that the change in zeta potential was caused by adhering of nitrifying bacteria to the carrier.

Example 5

In Example 4, when the apparatus is operated for a long period of time, a portion of the graphite particles may flow out of the system, and the treatment rate may degrade. In view of the problem, periodical replenishment of graphite particles was investigated in the present example 5. After the operation of Example 4, the wastewater treatment apparatus was operated in 5 series of graphite particle-replenishment rate per year, 0.01 weight %, 0.1 weight %, 1 weight %, 2 weight %, and 5 weight %. The graphite particle-replenishment rate per year means that, for example, in the case where the replenishment rate is 1 weight %, the apparatus with a capacity of 1.1 L is replenished with 11 g of graphite particles per year. Specifically, a total of 11 g of graphite particles was divided into 12 parts, and 11/12 g of graphite particles was added every month. The other operating conditions were the same as described in Example 4 above. The nitrogen removal percentages obtained after operating the apparatus for 1 year are shown in the following Table 5.

TABLE 5

| Sample | Graphite particle-replenishment rate (volume %) | Average nitorogen removal percentage (%) | Standard deviation of removal percentage |
|---|---|---|---|
| 1 | 0.01 | 45 | 18 |
| 2 | 0.1 | 48 | 12 |
| 3 | 1 | 54 | 6.0 |
| 4 | 2 | 58 | 4.2 |
| 5 | 5 | 62 | 4.1 |

As is clear from Table 5, the standard deviation of the removal rate tended to be stabilized in the cases of Samples 2, 3, 4, and 5, and in particular, the standard deviation of the removal rate tended to be stabilized remarkably in the cases of Samples 3, 4, and 5. This indicates that it is preferable that the graphite particle-replenishment rate per year be 0.1 weight % or greater, more preferably 1 weight % or greater.

The addition of graphite particles is not limited to the case of the SNAP process, but it is possible to employ the addition of graphite particles in the cases where only the anammox bacteria-adhered particle is used, as shown in Examples 1 to 3.

Example 6

A treatment operation was carried out in the same manner as described in Example 1, using activated carbon having an average particle size of 5 μm (powdered activated carbon manufactured by Wako Pure Chemical Corp., product code 037-02115) as the carrier. The zeta potential of the carrier was −21.5 mV. After 1 month of the operation, the nitrogen removal speed was 1.07 kg-N/m³/day. The zeta potential of the anammox bacteria-adhered particle was −24.3 mV.

Comparative Example 1

A treatment operation was carried out in the same manner as described in Example 1, using an anammox bacteria carrier employing a carrier containing PVA alone. The nitrogen removal speed reached only 0.2 kg-N/m³/day even after 3 months of the operation.

Comparative Example 2

Carbon particles having an average particle size of 1100 μm or 0.1 μm were used as the carrier, and an anammox bacteria carrier was prepared in the same manner as described in Example 1, to carry out a treatment operation. The nitrogen removal speed reached only 0.1 kg-N/m³/day after 1 month of the operation.

Other Embodiments

Figure 8:
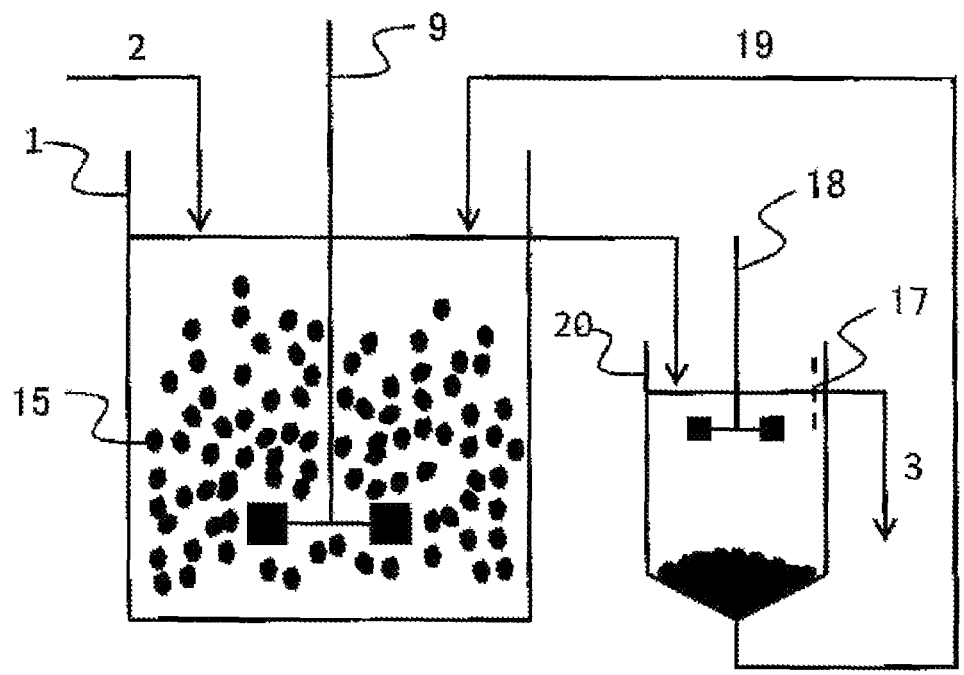
FIG. 8 is a schematic view illustrating a modified example of the wastewater treatment apparatus of the present invention.

Embodiments of single tank-type wastewater treatment apparatus have been described in Examples 1 to 6 above. However, the embodiments are not limited to such a structure. It is also possible to employ such a structure as shown in FIG. 8, in which a separation tank 20 for separating carriers and treatment water is provided and separated carriers are returned to the wastewater treatment tank 1 using a return pipe 19. It should be noted that in FIG. 8, like components having the same functions as those depicted in FIGS. 1 and 6 are designated by like reference numerals. In FIG. 8, reference numeral 18 denotes an agitator for pulverizing the outflow carriers.

INDUSTRIAL APPLICABILITY

The present invention is applicable to a wastewater treatment apparatus that uses carbon particles to which anammox bacteria are adhered.

REFERENCE SIGNS LIST

1—Reaction tank
4—Wastewater treatment section
5—Waste material reserving section
6—Carbon particle to which anammox bacteria are adhered (anammox bacteria-adhered particle)
7—Carbon particle

The invention claimed is:
1. An anammox bacteria-adhered particle, comprising a carrier comprising isotropic graphite particles and anammox bacteria adhered to the carrier.
2. The anammox bacteria-adhered particle according to claim 1, wherein the carrier has an apparent zeta potential of −35 mV to 0 mV.
3. The anammox bacteria-adhered particle according to claim 2, wherein the isotropic graphite particles have an average particle size of 2 μm to 1000 μm.
4. The anammox bacteria-adhered particle according to claim 1, wherein the isotropic graphite particles have an average particle size of 2 μm to 1000 μm.
5. A wastewater treatment apparatus, characterized in that the anammox bacteria-adhered particle according to claim 1 is disposed in a wastewater treatment tank.
6. The wastewater treatment apparatus according to claim 5, further comprising a carbon particle supply unit that supplies the isotropic graphite particles constantly or intermittently.
7. A wastewater treatment apparatus, characterized by comprising a wastewater treatment section that treats wastewater by stirring and flowingly moving the anammox bacteria-adhered particle according to claim 1, and a waste material reserving section that stores the isotropic graphite particles that have lost anammox activity and from which the anammox bacteria have been detached, the wastewater treatment section and the waste material reserving section being separated from each other.
8. The wastewater treatment apparatus according to claim 7, further comprising a carbon particle supply unit that supplies the isotropic graphite constantly or intermittently.
9. A wastewater treatment apparatus, characterized by comprising the anammox bacteria-adhered particle according to claim 1 and a nitrifying bacteria-adhered particle in which nitrifying bacteria are adhered to carbon particles, the anammox bacteria-adhered particle and the nitrifying bacteria-adhered particle being disposed in a common wastewater treatment tank.

10. The wastewater treatment apparatus according to claim 9, further comprising a carbon particle supply unit that supplies the isotropic graphite particles constantly or intermittently.

11. An anammox bacteria-adhered particle, comprising a carrier consisting of carbon particles and only anammox bacteria adhered to the carrier.

12. The anammox bacteria-adhered particle according to claim 11, wherein the carrier has an apparent zeta potential of −35 mV to 0 mV.

13. The anammox bacteria-adhered particle according to claim 11, wherein the carbon particles have an average particle size of 2 µm to 1000 µm.

14. The anammox bacteria-adhered particle according to claim 11, wherein the anammox bacteria-adhered particle consists of the carrier consisting of carbon particles and the anammox bacteria adhered to the carrier.

15. A wastewater treatment apparatus, characterized in that the anammox bacteria-adhered particle according to claim 14 is disposed in a wastewater treatment tank.

16. A wastewater treatment apparatus, characterized by comprising a wastewater treatment section that treats wastewater by stirring and flowingly moving the anammox bacteria-adhered particle according to claim 14, and a waste material reserving section that stores the carbon particles that have lost anammox activity and from which the anammox bacteria have been detached, the wastewater treatment section and the waste material reserving section being separated from each other.

17. A wastewater treatment apparatus, characterized in that the anammox bacteria-adhered particle according to claim 11 is disposed in a wastewater treatment tank.

18. The wastewater treatment apparatus according to claim 17, further comprising a carbon particle supply unit that supplies the carbon particles constantly or intermittently.

19. A wastewater treatment apparatus, characterized by comprising a wastewater treatment section that treats wastewater by stirring and flowingly moving the anammox bacteria-adhered particle according to claim 11, and a waste material reserving section that stores the carbon particles that have lost anammox activity and from which the anammox bacteria have been detached, the wastewater treatment section and the waste material reserving section being separated from each other.

20. A wastewater treatment apparatus, characterized by comprising the anammox bacteria-adhered particle according to claim 11 and a nitrifying bacteria-adhered particle in which nitrifying bacteria are adhered to carbon particles, the anammox bacteria-adhered particle and the nitrifying bacteria-adhered particle being disposed in a common wastewater treatment tank.

* * * * *